US011711440B2

(12) United States Patent
Davey et al.

(10) Patent No.: US 11,711,440 B2
(45) Date of Patent: Jul. 25, 2023

(54) CODE MONITORING TO RECOMMEND ALTERNATIVE TRACKING APPLICATIONS

(71) Applicant: SHOPIFY INC., Ottawa (CA)

(72) Inventors: Joshua Davey, Scarborough (CA); Chi Wai Ng, Toronto (CA); Egan Cheung, Manotick (CA); Jonathan Burns, Toronto (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 17/142,958

(22) Filed: Jan. 6, 2021

(65) Prior Publication Data

US 2022/0217212 A1  Jul. 7, 2022
US 2022/0385731 A2  Dec. 1, 2022

(51) Int. Cl.
| | |
|---|---|
| *G06F 11/34* | (2006.01) |
| *H04L 67/50* | (2022.01) |
| *G06F 8/61* | (2018.01) |
| *H04L 67/00* | (2022.01) |
| *G06Q 30/0201* | (2023.01) |

(52) U.S. Cl.
CPC .............. *H04L 67/535* (2022.05); *G06F 8/61* (2013.01); *H04L 67/34* (2013.01); *G06Q 30/0201* (2013.01)

(58) Field of Classification Search
CPC ........... H04L 67/22; H04L 67/34; G06F 8/61; G06Q 30/0201
USPC ...................................................... 709/224
See application file for complete search history.

(56) References Cited

U.S. PATENT DOCUMENTS

| | | | | |
|---|---|---|---|---|
| 2008/0163366 | A1* | 7/2008 | Chinya ............... | G06F 12/1027 726/21 |
| 2013/0305368 | A1* | 11/2013 | Ford ..................... | G06F 21/568 726/23 |
| 2015/0010215 | A1* | 1/2015 | Fukuda ................. | G06V 40/13 382/115 |
| 2015/0339460 | A1* | 11/2015 | Marsico ................. | G16H 20/10 705/2 |
| 2015/0339736 | A1* | 11/2015 | Bennett ............... | G06Q 30/0278 705/306 |
| 2017/0286075 | A1* | 10/2017 | Kaipu ..................... | G06F 21/57 |
| 2018/0314880 | A1* | 11/2018 | Fadeev ............... | G06Q 30/0201 |
| 2020/0133982 | A1* | 4/2020 | Thangeswaran .... | G06F 16/9535 |
| 2020/0334325 | A1 | 10/2020 | Courouble | |

OTHER PUBLICATIONS

Deepa et al., "Securing web applications from injection and logic vulnerabilities: Approaches and challenges", Information and Software Technology, vol. 74, Feb. 2016, pp. 160-180, DOI: 10.1016/J.INFSOF.2016.02.005 (21 pages).
Extended European Search Report for EP 21192775.1 dated Feb. 15, 2022 (8 pages).

\* cited by examiner

*Primary Examiner* — Sibte H Bukhari
(74) *Attorney, Agent, or Firm* — Foley & Lardner LLP

(57) ABSTRACT

Disclosed herein at methods and systems for monitoring and analyzing code and identifying a suitable substitute for the identified code. A central server identifies inserted code configured to communicate session data to a second server. The central server then identifies an application having functionality corresponding to the inserted code. The central server then provides an indication of the corresponding application.

20 Claims, 5 Drawing Sheets

CODE MONITORING TO RECOMMEND ALTERNATIVE TRACKING APPLICATIONS

TECHNICAL FIELD

This application relates generally to identification and substitution of inserted code, and in particular tracking pixels.

BACKGROUND

Tracking pixels refer to code snippets loaded onto the script of a website (e.g., HTML, code of the website). The tracking pixel monitors and tracks behavior of different users interacting with the website. The tracking pixel then transmits the collected data to a destination address (or a destination server) where the data can be analyzed and used for online marketing, web analysis, and/or displaying content that is targeted/customized for different users.

Allowing web administrators to insert tracking pixels into a website (or a specific webpage within the website) has created technical challenges. First, the use of tracking pixels can often lead to security vulnerabilities, especially with web administrators who are unfamiliar with tracking pixel technology and insert and/or modify website code.

Second, a web administrator must periodically monitor the version of the tracking pixels to ensure that the code snippets are updated. This website maintenance process is generally time-consuming and labor-intensive. For instance, websites having multiple interconnected webpages may include multiple tracking pixels communicating with different destination addresses and servers. One or more tracking pixels that are not updated may conflict with the website's code and cause technical challenges.

Third, removing tracking pixels may also be a time-consuming and tedious task. When a tracking pixel is no longer needed, a web administrator must identify and delete the corresponding code. Conventional methods and systems do not provide an automatic method of tracking pixel removal. Therefore, the web administrator must manually identify and delete the code associated with different tracking pixels, which may result in erroneous deletion of code necessary for the website.

BRIEF DESCRIPTION OF THE DRAWINGS

The accompanying drawings constitute a part of this specification and illustrate embodiments of the subject matter disclosed herein.

FIG. 2 shows a home page of an administrator, according to an embodiment.

DETAILED DESCRIPTION

Figure 1:
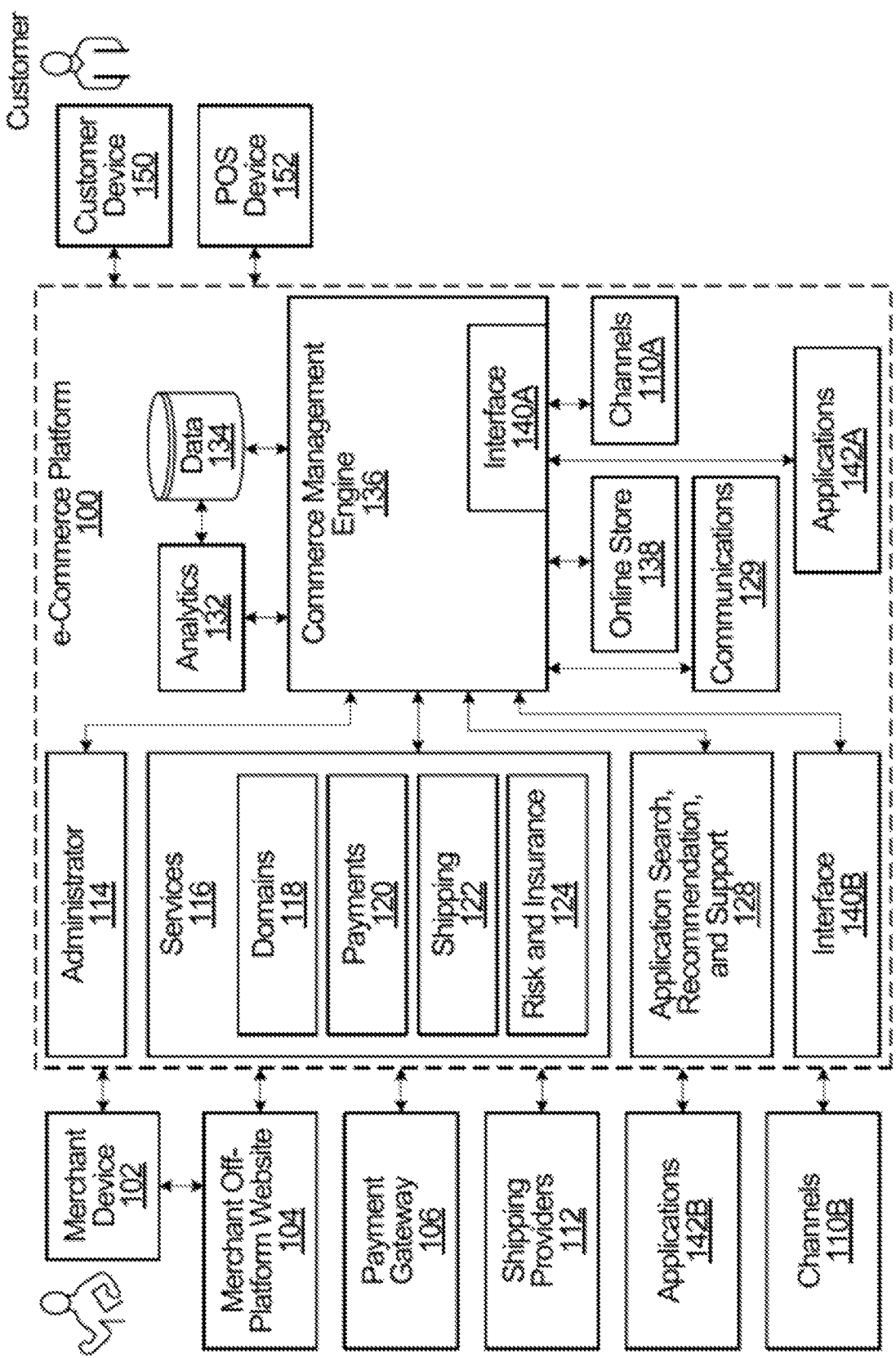
FIG. 1 shows an e-commerce platform, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

For the reasons described above, it is undesirable to allow web administrators (e.g., a merchant associated with a merchant website or an online store) to insert tracking pixels through writing, adjusting, and/or inserting web code into websites. However, because monitoring and tracking user behavior can be an integral part of targeted advertising, web administrators should identify suitable substitutes for the desired tracking pixel functionality. To solve the above-described technical challenges, a tracking pixel substitution system (TPSS) can identify and analyze tracking pixels associated with (e.g., injected into) a website and can further recommend pre-approved web tracking applications that provide similar services and functionalities. Utilizing pre-approved web tracking applications from trusted parties can reduce security risk.

I. Example E-Commerce Platform

In some embodiments, the methods disclosed herein may be performed on or in association with a commerce platform, such as an e-commerce platform. Therefore, an example of a commerce platform will be described.

FIG. 1 illustrates an e-commerce platform 100, according to an illustrative system embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the e-commerce platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), and the like. However, even these 'other' merchant commerce facilities may be incorporated into the e-commerce platform 100, such as where POS devices 152 in a physical store of a merchant are linked into the e-commerce platform 100, where a merchant off-platform website 104 is tied into the e-commerce platform 100, such as through 'buy buttons' that link content from the merchant off-platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms of online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The web browser (or other application) of the customer device 150 then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their web site through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g., as data facility 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
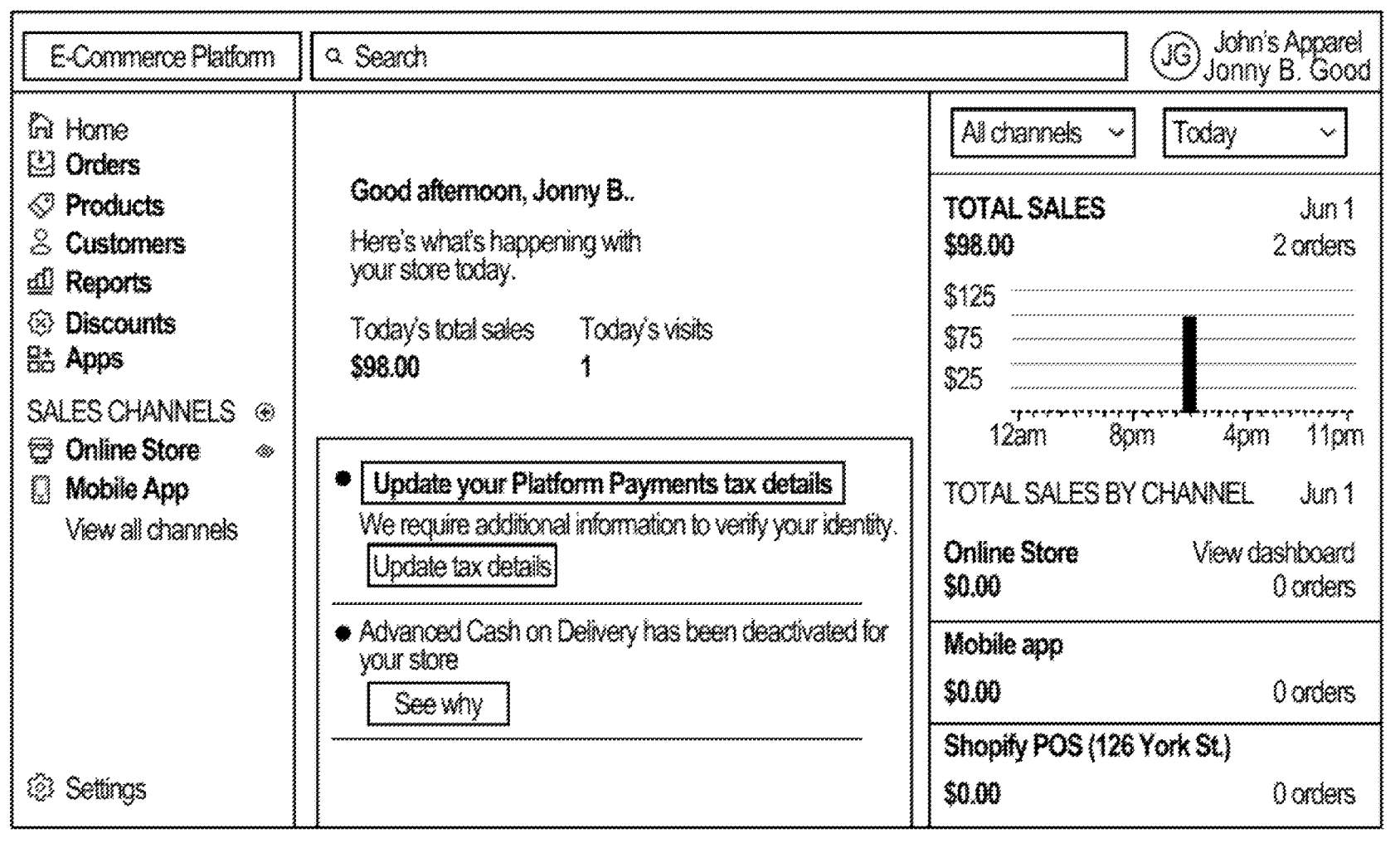

FIG. 2 depicts a non-limiting embodiment for a home page of a merchant administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store 138, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the merchant device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g., via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the e-commerce platform 100 or by a different party. In some embodiments, an application 142B may be provided by the same party providing the e-commerce platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the e-commerce platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the e-commerce platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, backpressure to prevent degradation, and the like.

Although isolating online store data is important to maintaining data privacy between online stores 138 and merchants, there may be reasons for collecting and using crossstore data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension or API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third-party, where the third-party application creates a fulfillment record. A legacy fulfillment service may trigger a custom API call from the commerce management engine 136 to a third-party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

II. Example Networked Components of System

Figure 3:
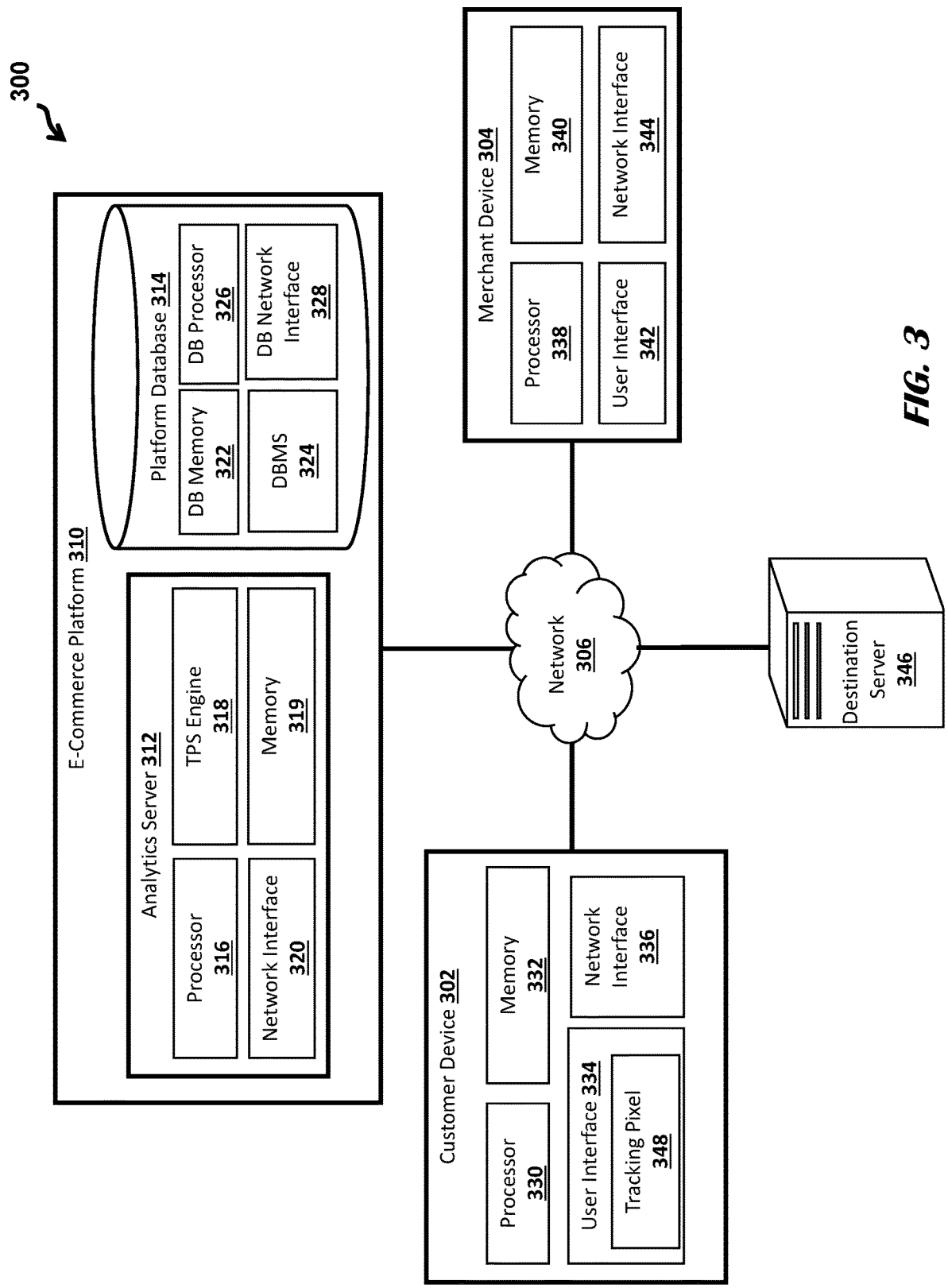
FIG. 3 shows components of a tracking pixel substitution system, according to an embodiment.

FIG. 3 illustrates components of a tracking pixel substitution system (TPSS) 300, according to an embodiment. The TPSS 300 includes customer device 302 and merchant device 304 to connect with an e-commerce platform 310 via one or more networks 306. The TPSS 300 may also include a destination server 346 in communication with a tracking pixel 348 inserted (or to be inserted) into a website associated with the e-commerce platform 310 and the merchant device 320. As will be described below, the destination server 346 may be in communication with a website hosted or otherwise associated with the analytics server 312 through the e-commerce platform 310.

The illustrative TPSS 300 is described and shown in FIG. 3 as having one of each component for ease of description and understanding of an example. It should, however, be appreciated that embodiments may include any number of the components described herein. It should be further appreciated that embodiments may comprise additional or alternative components, or may omit certain components, and still fall within the scope of this disclosure.

The network 306 may include any number of networks, which may be public and/or private networks. The network 306 may comprise hardware and software components implementing various network and/or telecommunications protocols facilitating communications between various devices, which may include devices of the TPSS 300 or any number of additional or alternative devices not shown in FIG. 3. It should be appreciated that the network 306 may be implemented as a cellular network, a Wi-Fi network, or other wired local area network (LAN) or wireless LAN, a WiMAX network or other wireless or wired wide area network (WAN), and the like. The network 306 may also communicate with external servers of other external services coupled to the network 306, such as servers hosting a social media platform, a banking platform, or the destination server 346.

The network 306 may include any number of security devices or logical arrangements (e.g., firewalls, proxy servers, DMZs) to monitor or otherwise manage web traffic to the e-commerce platform 310. Security devices may be configured to analyze, accept, or reject incoming web requests from customer device 302, merchant device 304, and/or the destination server 346. In some embodiments, a security device may be a physical device (e.g., a firewall). A security device may be a software application (e.g., Web Application Firewall (WAF)) that is hosted on, or otherwise integrated into, another computing device of the TPSS 300. The security devices monitoring web traffic are associated with, and administered by, the e-commerce platform 310.

Merchant device 304 may be an electronic device associated with merchant accounts of the e-commerce platform 310. Customer device 302 may be an electronic device associated with a user who is not operating as merchants, such as end-point customers or potential customers, who are visiting online stores of merchants on the e-commerce platform 310. It should be appreciated that, in some circumstances, a customer device 302 and a merchant device 304 can be the same device, as merchants may sometimes navigate webpages for online stores of the e-commerce platform 310 when the merchant is acting in the capacity of a customer. As such, a customer device 302 may sometimes act as a merchant device 304 while at other times act as a customer device 302. In an example, a merchant may use the same device to both configure the merchant settings for the online store (or other configuration settings) and then browse the online stores of other merchants on the e-commerce platform 310.

The customer device 302 and the merchant device 304 may be any electronic device comprising hardware and software components capable of performing the various tasks and processes described herein. Non-limiting examples of the customer device 302 and the merchant device 304 include mobile phones, tablets, laptops, and personal computers, among others. When communicating with components of the e-commerce platform 310, customer device 302 and merchant device 304 may generate web traffic (or web session data) that is processed by or otherwise accessible to the analytics server 312 of the e-commerce platform 310. The web traffic or web session data may also be accessible to one or more tracking pixels (e.g., tracking pixel 348) in communication with the destination server 346. The web traffic comprises data packets that includes various types of data that can be parsed, analyzed, or otherwise reviewed by various programmatic algorithms of the analytics server 312.

When a customer device 302 visits a website of a merchant (e.g., an online store of the merchant), the analytics server 312 of the e-commerce platform 310 serves a webpage for the online store to the customer device 302. A browser or other application of the customer device 302 transmits a request to the e-commerce platform 310 for the webpage for the online store of the merchant. The analytics server 312 may receive the request for the webpage from the browser or other application of the customer device 302, where the browser (or other application) connects the customer device 302 to the analytics server 312 using an IP Address obtained by translating a domain name. The analytics server 312 may execute code associated with the website and render the appropriate graphics to be presented to the customer device 302. In return, the analytics server 312 transmits the requested webpage hosting the online store of the merchant for display on a customer user interface 334, such as a browser application or other application executing on the customer device 302.

Even though certain embodiments described herein describe the website as being hosted by the analytics server 312, it is expressly understood that methods and systems described herein also apply to websites associated with the merchant device 304 that are not hosted by the analytics server 312. For instance, the analytics server 312 may monitor the merchant's online store and recommend a suitable web tracking application, even if the online store is hosted by a separate webserver (not shown here). Furthermore, the methods described herein are also applicable in other environments, such as non-ecommerce infrastructures and system architectures. For instance, the methods described herein can be implemented by a server as a software as a service (SaaS) to identify suitable web tracking application(s) for a website (or any other electronic platform) that is not part of the e-commerce systems described herein.

The webpage presented on the user interface 334 may include the tracking pixel 338. As described herein, the tracking pixel 338 may have been previously injected into the webpage by the merchant device 304. The tracking pixel 348 may communicate with the destination server 346. When a customer accesses the webpage displayed on the customer device 402, the tracking pixel 348 may monitor the customer's interactions with the webpage and may transmit the monitored data to the destination server 346.

The customer device 302 may be a mobile phone, tablet, laptop or computer owned and/or used by a customer. The customer device 302 includes a customer processor 330, customer memory 332, customer user interface 334, and customer network interface 336. An example of a customer user interface 334 is a display screen (which may be a touch screen), a gesture recognition system, a keyboard, a stylus, and/or a mouse. The customer network interface 336 is provided for communicating over the network 306. The structure of the customer network interface 336 will depend on how the customer device 302 interfaces with the network 306. For example, if the customer device 302 is a mobile phone or tablet, the customer network interface 336 may include a transmitter/receiver with an antenna to send and receive wireless transmissions to/from the network 306.

If the customer device 302 is a personal computer connected to the network 306 with a network cable, the customer network interface 336 may include, for example, a network interface card (NIC), a computer port, and/or a network socket. The customer processor 330 directly performs or instructs all of the operations performed by the customer device 302. Non-limiting examples of these operations include processing user inputs received from the customer user interface 334, preparing information for transmission over the network 306, processing data received over the network 306, and instructing a display screen to display information. The customer processor 330 may be implemented by one or more processors that execute instructions stored in the customer memory 332. Alternatively, some or all of the customer processor 330 may be implemented using dedicated circuitry, such as an ASIC, a GPU, or a programmed FPGA.

The merchant device 304 may be a mobile phone, tablet, laptop, or computer used by a merchant. The merchant device 304 includes a merchant processor 338, merchant memory 340, a merchant user interface 342, and a merchant network interface 344. An example of a merchant user interface 342 is a display screen (which may be a touch screen), a keyboard, and/or a mouse. The merchant network interface 344 is provided for communicating over the network 306. The structure of the merchant network interface 344 will depend on how the merchant device 304 interfaces with the network 306. For example, if the merchant device 304 is a mobile phone or tablet, the merchant network interface 344 may include a transmitter/receiver with an antenna to send and receive wireless transmissions to/from the network 306.

If the merchant device 304 is a personal computer connected to the network 306 with a network cable, the merchant network interface 344 may include, for example, a NIC, a computer port, and/or a network socket. The merchant processor 338 directly performs or instructs all of the operations performed by the merchant device 304. Examples of these operations include processing user inputs received from the merchant user interface 342, preparing information for transmission over the network 306, processing data received over the network 306, and instructing a display screen to display information. The merchant processor 338 may be implemented by one or more processors that execute instructions stored in the merchant memory 340. Alternatively, some or all of the merchant processor 338 may be implemented using dedicated circuitry, such as an ASIC, a GPU, or a programmed FPGA.

The e-commerce platform 310 is a computing system infrastructure that may be owned and/or managed (e.g., hosted) by an e-commerce service and, in some embodiments, may be the same as or similar to that described with reference to FIGS. 1-2, though this need not be the case. The e-commerce platform 310 includes electronic hardware and software components capable of performing various processes, tasks, and functions of the e-commerce platform 310. For instance, the computing infrastructure of the e-commerce platform 310 may comprise one or more platform networks (not shown) interconnecting the components of the e-commerce platform 310. The platform networks may comprise one or more public and/or private networks and include any number of hardware and/or software components capable of hosting and managing the networked communication among devices of the e-commerce platform 310.

As depicted in FIG. 3, the components of the e-commerce platform 310 include the analytics server 312 and a platform database 314. However, it should be appreciated that embodiments may include additional or alternative components capable of performing the operations described herein. In some implementations, certain components of the e-commerce platform 310 may be embodied in separate computing devices that are interconnected via one or more public and/or private internal networks. In some implementations, certain components of the e-commerce platform 310 may be integrated into a single device. For instance, the analytics server 312 may host the platform database 314.

Furthermore, the e-commerce platform 310 may include the analytics server 312 configured to serve various functions of the e-commerce platform 310. Non-limiting examples of such functions may include webservers hosting webpages on behalf of merchants (e.g., online stores), security servers executing various types of software for monitoring web traffic (e.g., sale regulation engine), and database servers hosting various platform databases 314 of the e-commerce platform 310, among others. The analytics server may also monitor the code associated with a website of the merchant device 304 and identify/present a suitable web tracking application substitute.

The illustrative e-commerce platform 310 of FIG. 3 is shown and described as having only one analytics server 312 performing each of the various functions of the e-commerce service. For instance, the analytics server 312 is described as serving the functions of executing the tracking pixel substitution (TPS) engine 318 and a webserver (hosting webpages for online stores and account administration. It should, however, be appreciated that FIG. 3 is merely illustrative and that embodiments are not limited to the description of TPSS 300 or the particular configuration shown in FIG. 3. The software and hardware of the analytics server 312 may be integrated into a single distinct physical device (e.g., a single analytics server 312) or may be distributed across multiple devices (e.g., multiple analytics servers 312).

For example, some operations may be executed on a first computing device while other operations may be executed on a second computing device, such that the functions of the analytics server 312 are distributed among the various computing devices. In some implementations, the analytics server 312 may be a virtual machine (VM) that is virtualized and hosted on computing hardware configured to host any number of VMs.

The platform database 314 stores and manages data records concerning various aspects of the e-commerce platform 310, including information about, for example, actors (e.g., merchants, consumers, platform administrators), electronic devices, merchant offerings (e.g., products, inventory, services), various metrics and statistics, machine-learning models, merchant pages hosting merchant stores, and other types of information related to the e-commerce platform 310 (e.g., usage and/or services).

The platform database 314 may also include various libraries and data tables including detailed data associated with different tracking pixels and various web tracking applications. For instance, the analytics server 312 may generate a data table associated with different code snippets for different tracking pixels. The analytics server 312 may store data associated with tracking pixels, such as destination servers and other associated servers, code templates, functionality associated with different tracking pixels, and the like.

The analytics server 312 may also generate a data table associated with different web tracking applications. The analytics server 312 may include data associated with each web tracking application, such as destination servers, code, templates, functionality, periodicity of data transmittal, data to be transmitted to the destination server (e.g., type and category of data monitored and/or transmitted by the web tracking application to its destination server), and the like. The data table may also include a data record indicating whether each respective web tracking application is pre-approved and authorized to be used for different merchants.

The analytics server 312 may analyze different web tracking applications and determine whether each web tracking application satisfies a set of predetermined rules, regulations, and thresholds. If a web tracking application satisfies the predetermined rules, the analytics server 312 may modify a data record within the platform database 314 indicating that the web tracking application is a suitable substitute and authorized to be used for the merchant device 304.

The predetermined rules, regulations, and thresholds may be set by the analytics server 312 or a system administrator of the e-commerce platform 310. Additionally or alternatively, the merchant device may input or modify the predetermined rules. For instance, the analytics server may keep a separate data table including a list of trusted destination servers, which have been previously identified as secure and trusted. However, the merchant device 304 may add or remove different destination servers from such a list. If a web tracking application is associated with a trusted destination server, the analytics server 312 may modify the data table such that the web tracking application is designated as a suitable substitute. Other non-limiting examples of rules may include thresholds associated with category or periodicity of data monitored and/or transmitted by each web tracking application. For instance, a predetermined rule may indicate that a web tracking application that monitors payment information of the customer device 302 is not an acceptable substitute.

Moreover, the merchant device 304 may revise the list of web tracking applications and/or their designations as needed. For instance, the merchant device 304 may indicate a list of preferred or prohibited web tracking applications for the merchant's web site. In another non-limiting example, the merchant device 304 may indicate that the merchant website cannot be in communication with a particular destination server. In those embodiments, the analytics server 312 removes any web tracking application associated with that particular destination server from the list of web tracking applications.

The platform database 314 may be hosted on any number of computing devices having a processor (sometimes referred to as a database (DB) processor 326) and non-transitory machine-readable memory configured to operate as a DB memory 322, and capable of performing the various processes and tasks described herein. For example, one or more analytics servers 312 may host some or all aspects of the platform database 314.

A computing device hosting the platform database 314 may include and execute database management system (DBMS 324) software, though a DBMS 324 is not required in every potential embodiment. It should be appreciated that the platform database 314 can be a single, integrated database structure or may be distributed into any number of database structures that are configured for some particular types of data needed by the e-commerce platform 310. For example, a first database could store user credentials and be accessed for authentication purposes, and a second database could store raw or compiled machine-readable software code (e.g., HTML, JavaScript) for webpages such that the DB memory 340 is configured to store information for hosting webpages.

The computing device hosting the platform database 314 may further include a DB network interface 328 for communicating via platform networks of the e-commerce platform 310. The structure of the DB network interface 328 will depend on how the hardware of the platform database 314 interfaces with other components of the e-commerce platform 310. For example, the platform database 314 may be connected to the platform network with a network cable, the DB network interface 328 may include, for example, a NIC, a computer port, and/or a network socket. The DB processor 326 directly performs or instructs all of the operations performed by the platform database 314.

Non-limiting examples of such operations include processing queries or updates received from the analytics server 312, customer device 302, and/or merchant device 304; preparing information for transmission via the platform network and/or the external networks 306; and processing data received via the platform network and/or the external networks 306. The DB processor 326 may be implemented by one or more processors that execute instructions stored in the DB memory 322 or other non-transitory storage medium. Alternatively, some or all of the DB processor 322 may be implemented using dedicated circuitry, such as an ASIC, a GPU, or a programmed FPGA.

The DB memory 322 of the platform database 314 may contain data records related to, for example, merchant flash sale events, consumer activity, and various information and metrics derived from web traffic involving customer device 302. The data may be accessible to the analytics server 312. The analytics server 312 may issue queries to the platform database 314 and data updates based upon, for example, code snippets identified. For instance, the analytics server 312 may identify the tracking pixel 348 and its corresponding code and may query the platform database 314 to retrieve a suitable substitute web tracking application.

The platform database 314 may store data received from a customer device 302 or merchant device 304. For example, a merchant can use a merchant administration webpage or other user interface to insert code snippets that control the merchant website (e.g., tracking pixels). In this example, the merchant's inputs correspond to the tracking pixel 348 that is configured to monitor web session data associated with the merchant's online store. The merchant device 304 may access the e-commerce platform 310 and may insert the code associated with the tracking pixel 348 into the code associated with the merchant's online store (e.g., HTML code of the website). The analytics server 312 may receive the code associated with the tracking pixel 348, and the analytics server 312, in turn, updates the data records for the merchant in the platform database 314 to reflect the newly implemented tracking pixel 348.

The analytics server 312 may be any computing device that comprises a server processor 316 and non-transitory machine-readable storage media (e.g., server memory 319) and that is capable of executing the software for one or more functions, such as TPS engine 318. In some cases, the server memory 319 may store or otherwise contain the computer-executable software instructions, such as the TPS engine 318. The software and hardware components of the analytics server 312 enable the analytics server 312 to perform various operations that serve particular functions of the e-commerce platform 310.

For example, the analytics server 312 that serves as a webserver may execute various types of web server software (e.g., Apache®, Microsoft IIS®). As another example, the analytics server 312 that serves as a security server may execute software for monitoring and analyzing inserted code, such as the tracking pixel 348. It should be appreciated that these are merely examples and not intended to be limiting as to the potential arrangements or functions of the analytics server 312. Non-limiting examples of the analytics server 312 may include desktop computers, laptop computers, and tablet devices, among others.

The analytics server 312 may execute the TPS engine 318 that detects the inserted code (e.g., tracking pixel 348) and identifies suitable web tracking application substitutes. The location of the TPS engine 318 is merely an example. The TPS engine 318 may be provided, at least in part, by the analytics server 312 hosting the particular online store or may be an application or service of any other analytics server 312 that is supported by or in communication with the analytics server 312 hosting the online store.

Additionally or alternatively, the TPS engine 318 could be provided by the e-commerce platform 310 as a separate web-based or cloud-based service. In some implementations, the TPS engine 318 is implemented at least in part by a user device, such as the merchant device 304. Other implementations of the TPS engine 318 are also contemplated, such as a stand-alone service to regulate code inserted into websites. While the TPS engine 318 is shown as a single component of the e-commerce platform 310, the TPS engine 318 could be provided by multiple different components that are in networked communication with the analytics server 312 executing the TPS engine 318. The TPS engine 318 (or other software of the analytics server 312) executes algorithms and software code that analyze websites and provide suitable web tracking applications.

In operation, the merchant device 304 may utilize services provided by the analytics server 312 and the e-commerce platform 310. Specifically, the analytics server 312 may host a website (e.g., online store) for the merchant device 304. The merchant device 304 may access the e-commerce platform 310 and revise the web site's code and insert the tracking pixel 348 configured to communicate with the destination server 346. The analytics server 312 may use various methods described herein (e.g., method 400 described in FIG. 4) to identify and analyze the tracking pixel 348 and determine suitable web tracking application substitute. The analytics server 312 may also display a prompt on the merchant device 304 to recommend the identified web tracking application. If authorized, the analytics server 312 may also remove the tracking pixel 348 and/or install the identified web tracking application.

III. Methods of Identifying and Substituting of Tracking Pixels

Figure 4:
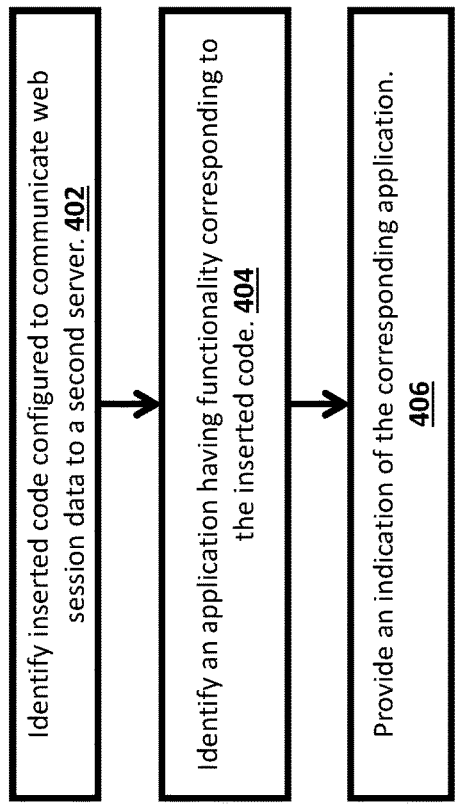
FIG. 4 shows execution steps for identifying and substituting tracking pixels, according to an embodiment.

FIG. 4 illustrates a flowchart depicting operational steps for a TPSS, in accordance with an embodiment. The method 400 describes how a server, such as the analytics server described in FIG. 3, identifies inserted code (e.g., tracking pixels) configured to communicate with third-party servers (e.g., destination server described in FIG. 3) and identifies and presents a suitable replacement. Even though the method 400 is described as being executed by the analytics server, the method 400 can be executed by any server and/or locally within a user's computing device (e.g., merchant device discussed in FIG. 3) or as a browser extension. Additionally or alternatively a server can execute the method 400 in other computer environments (other than the environments depicted in FIGS. 1-3). For instance, the method 400 can be executed by a server providing SaaS in a non-ecommerce infrastructure for any electronic platform (e.g., any website regardless of whether the website is related to e-commerce).

Additionally or alternatively, the method 400 can be executed by a webserver acting as both a webserver and the analytics server by hosting the website and generating the prompts described herein. Furthermore, other configurations of the method 400 may comprise additional or alternative steps, or may omit one or more steps altogether.

Even though aspects of the embodiments described herein are described in the context of tracking pixels configured to monitor websites, it is expressly understood that the method 400 is applicable to any inserted code configured to communicate with a destination server. For instance, the method 400 is also applicable to any electronic platform having executable code (e.g., native applications and/or graphical user interfaces) that is configured to interact with an end-user. Therefore, the method 400 is not limited to websites. The analytics server may utilize the method 400 to monitor any inserted code configured to monitor an application and communicate with an external source. The analytics server may also utilize the method 400 to identify suitable replacements for the identified inserted code.

An analytics server of a TPSS can implement the method 400 to identify and analyze tracking pixels injected into websites and can further recommend pre-approved web tracking applications that provide similar (or corresponding) services. Utilizing pre-approved web tracking applications from trusted parties can reduce security risk and improve customer (end-user) tracking functionality. Furthermore, using pre-approved web tracking applications can ensure that all corresponding code snippets are removed when the web tracking application is uninstalled.

In one embodiment, a computer-implemented method comprises identifying, by a server, inserted code configured to communicate session data to a second server. The server can identify an application having functionality corresponding to the inserted code. The server can provide an indication of the application.

In another embodiment, a server comprises a processor and a non-transitory computer-readable medium containing instructions that when executed by the processor may cause the processor to identify inserted code configured to communicate session data to a second server, identify an application having functionality corresponding to the inserted code, and provide an indication of the application.

In another embodiment, a computer system comprises a data repository configured to store code and a server in communication with the data repository. The server may be configured to identify inserted code inserted into the code stored onto the data repository. The inserted code may be configured to communicate session data to a second server. The server may be configured to identify an application having functionality corresponding to the inserted code; and provide an indication of the application.

In yet another embodiment, a machine-readable storage medium comprises computer-executable instructions stored thereon that, when executed by one or more processors, cause the one or more processors to perform operations comprising identifying inserted code configured to communicate session data to a second server, identifying an application having functionality corresponding to the inserted code, and providing an indication of the application.

In some configurations, the analytics server is configured to implement the method 500 for hosted websites that are part of a platform having an application ecosystem that supports installing third-party applications, such as the web tracking applications described herein. For instance, the analytics server may implement the method 400 on a website that is associated with an extensible platform that allows third-party developers to extend the platform's core functionality by developing applications that the platform's customers (e.g. merchants) can choose to register/install to their accounts.

At step 402, the analytics server may identify inserted code configured to communicate web session data to a second server. The analytics server may identify code snippets (e.g., tracking pixels) associated with a website. As will be discussed herein, the analytics server can implement this functionality at different times. For instance, the analytics server can identify the inserted code at the time the web administrator is injecting the tracking pixel, at the first instance that the tracking pixel is called, and/or while performing routine maintenance (any time after the tracking pixel is injected).

Implementation at Injection Time

As discussed herein, the analytics server may allow a web administrator (e.g., a merchant operating the merchant device discussed in FIG. 3) to modify code associated with a website (the website's HTML code). For instance, a merchant device may access an online platform provided by the analytics server (e.g., e-commerce platform discussed in FIG. 3) to customize one or more webpages by injecting a code snippet for a tracking pixel into the website. When the merchant device accesses the electronic platform to modify or revise the website code, the analytics server may monitor the website's code and the merchant's interactions with the platform. When the analytics server identifies that new code representing a tracking pixel is being injected, the analytics server may analyze the tracking pixel.

The analytics server may analyze the tracking pixel using various analytical protocols and methods. In a first non-limiting example, the analytics server may compare the code being inserted with pre-analyzed templates to analyze the tracking pixel and identify its attributes. The analytics server may query an internal or external template library to identify whether the tracking pixel uses a template that matches an existing tracking pixel template or an existing web tracking application template. For instance, the analytics server may determine that the inserted code matches (or partially matches) a tracking pixel previously identified by the analytics server.

In a second non-limiting example, the analytics server may parse and analyze the code snippet to identify a corresponding destination server communicating with the tracking pixel. The analytics server may analyze the parsed code and may identify a uniform resource locator or other indicators associated with the destination server, such as any identification of the destination server. Other non-limiting examples of destination server indicators may include IP address, MAC address, and the like.

In a third non-limiting example, the analytics server may initiate a call to the code snippet in a segregated environment to analyze the functionality of the tracking pixel. For instance, the analytics server may use various sandboxing techniques to isolate the inserted code. The analytics server may sandbox and isolate the identified code for security purposes, such that data transmitted to and from the identified code does not affect the website or other portions of the website code. The analytics server may execute the identified code associated with the tracking pixel without executing the rest of the code associated with the website. Using the isolation techniques, the analytics server may determine the calls initiated by the tracking pixel (e.g., requests being made), the data transmitted from the tracking pixel, and/or the data requested by the tracking pixel's associated servers (e.g., destination servers). Additionally or alternatively, the analytics server may transmit the identified code for the tracking pixel to a third-party for analysis.

Implementation During Routine Website Maintenance

In addition to identifying and/or analyzing tracking pixels at the time of injection, the analytics server may routinely inspect code to identify tracking pixels injected into websites. The analytics server may periodically parse the code associated with different websites (associated with the platform) and may use various analytical protocols to identify code snippets associated with different tracking pixels. For instance, the analytics server may compare the code associated with each tracking pixel with pre-identified tracking pixel code templates. In another example, the analytics server may use "sand-boxing" or "code isolation" techniques to identify whether a particular code snippet is communicating with a destination server.

The analytics server may analyze the tracking pixels using the methods discussed above (e.g., using the similar techniques utilized when implemented at injection time). Additionally or alternatively, the analytics server may first isolate the code of a previously injected tracking pixel. The analytics server may then monitor the data transmitted from the tracking pixel (e.g., data transmitted to the destination server). For instance, the analytics server may use an inline frame (e.g., iframe) to monitor data transmitted by the tracking pixel to the destination server. As described herein, the tracking pixel may monitor various web session data and transmit the monitored data to the destination server. The analytics server may determine the type of data (e.g., click maps, payment information, duration of visit, and/or browser cookies) generated by the end-users visiting the website. As will be described below, the analytics server may then query a data table to find a previously approved web tracking application that transmits similar data as the tracking pixel.

Additionally or alternatively, the analytics server may compare a website's code, as originally implemented with the website's current code to determine whether the website's code has been modified or revised. The analytics server may generate and locally store a copy of the website's original code (e.g., snapshot view of the code). When the analytics server determines that the website is potentially communicating with a destination server, the analytics server generates a second copy/snapshot view of the website's code representing the current website code. The analytics server may then compare the current website code with the original website code to determine the inserted code.

Implementation at Runtime

In addition to identifying and/or analyzing tracking pixels to determine web tracking application substitutes at the time of injection and/or during routine inspections, the analytics server may also identify and analyze tracking pixels at runtime. The analytics server may identify and/or analyze the tracking pixel while the code associated with the website is executing (e.g., website is being rendered and presented on the customer device). For instance, the analytic server may identify that a website (and its associated code) communicates with an external (e.g., third-party) server. The analytic server may then use one or more of the analytical protocols discussed above to identify the tracking pixel, its corresponding code and functionality, and/or identity of the destination server (e.g., URL of the destination server).

The analytics server may identify and/or analyze the tracking pixel after the first instance of execution of its corresponding code or after a number of times of execution. For instance, the analytics server may analyze the tracking pixel after the tracking pixel has communicated with the destination server a number of times (e.g., five times or any other number that can be revised by the merchant and/or a system administrator).

Even though different timings for identifying tracking pixels is described above, the method 400 is not limited to any of the above-described timings. For instance, the analytics server may identify tracking pixels at the time of injection in conjunction with identifying tracking pixels during routine website maintenance and/or at runtime, or any other combinations thereof.

Identifying and analyzing the tracking pixels at run time and/or during periodic website maintenance allows the analytics server to provide suitable web tracking application substitutes that may not be available at the time of injection. For instance, the analytics server may identify that a tracking pixel has been injected into a website at the time it is injected into the website. However, at the time of injection, the analytics server may not identify a suitable web tracking application to recommend to the merchant. The analytics server may periodically query the libraries (discussed in step 404) and may prompt the merchant device when a suitable web tracking application is identified.

At step 404, the analytics server may identify an application having functionality corresponding to the inserted code. The analytics server may identify an application that has similar or corresponding functionality to the code identified in step 402.

As discussed above, the analytics server may identify a portion or snippet of code that is configured to communicate with a destination server when executed. Upon identifying the destination server, the analytics server may query a data repository to identify one or more previously approved web tracking applications associated with the destination server (e.g., use the same destination address as the destination server). The data repository may include one or more libraries (e.g., lookup tables or data tables) that include different web tracking applications and their corresponding functionality. For instance, the libraries may include web tracking applications, their corresponding code, capabilities, destination servers, whether they are designated as authorized or approved by the analytics server, and the like.

The analytics server may either directly generate the data within the libraries or may use third-party sources to populate data records within the each library. For instance, the analytics server may retrieve web tracking application data (e.g., name, functionality, and the corresponding code) from a third-party data source and store the data within the library. In another example, the analytics server may use data feeds (e.g., RSS feeds) to populate the libraries. For instance, the analytics server may subscribe to an RSS feed of a data source associated with a web tracking application (e.g., website associated with the web tracking application, such as an online application store that includes description of the application) and automatically populate the library with data received via the RSS feed.

The analytics server may periodically update the library (e.g., web tracking applications and their corresponding data). For instance, upon monitoring various web tracking applications, the analytics server may update the library (e.g., add/remove web tracking applications or their corresponding attributes). Moreover, as discussed above, the merchant may revise the library and add website preferences and rules, as necessary.

Each web tracking application within the library may also be associated with a data record indicating whether the web tracking application is authorized (approved) as a substitute. The analytics server may analyze each web tracking application and may determine whether the web tracking application satisfies internal rules and regulations. For instance, the analytics server may parse the code for different web tracking applications and determine whether the code conflicts with various predetermined rules and thresholds. In another example, the analytics server may analyze different attributes and compare them against predetermined rules to determine whether the web tracking application is a suitable substitute. If the web tracking application satisfies the predetermined rules and thresholds, the analytics server may modify a data record indicating that the web tracking application is authorized (e.g., designated as a suitable substitute).

The analytics server may identify the suitable web tracking application using the destination address and/or the functionality associated with the tracking pixel. When using the destination server to select a suitable web tracking application, the analytics server may query the library using an indicator of the destination server (e.g., URL or IP address). In response, the analytics server may identify one or more web tracking applications associated with the destination server and each web tracking application may be designated as pre-approved or not suitable.

When using the functionality to select a suitable web tracking application, the analytics server may query the library using the functionality identified while monitoring the identified code (tracking pixel). As discussed above, the code associated with the tracking pixel may be configured to monitor web session data (e.g., how users navigate the website) and may transmit the web session data to the destination server. The analytics server may determine attributes of the data monitored and/or transmitted to the destination server using the identified code of the tracking pixel (e.g., type and/or frequency of data transmitted to the destination address). The analytics server may then query the library to identify a similar web tracking application with corresponding functionality (e.g., a web tracking application that monitors similar types of data).

In a non-limiting example, the analytics server may monitor the identified code and may determine that the identified code communicates with a particular uniform resource locator (URL). The analytics server may then query an internal library and identify three web tracking applications associated with the URL. The analytics server may then determine that only one of the three identified web tracking applications is designated as pre-approved.

In another non-limiting example, the analytics server may identify a tracking pixel and its corresponding code that has been inserted into the website. The analytics server monitors the tracking pixel and determines the data transmitted to the destination server's URL. The analytics server may determine that the tracking pixel transmits web session data (e.g., how end-users navigate the website, such as a click heat map) to the URL. The analytics server may query the library and identify three web tracking applications associated with the URL. The analytics server may then analyze each web tracking application and identify the web tracking application that has similar functionality as the tracking pixel (e.g., analyzes and monitors end-user's click heat map).

Additionally or alternatively, the analytics server may utilize a third-party to perform portions of or all steps described herein. For instance, the library discussed herein may be generated and/or updated by a third-party, and the analytics server may transmit queries and receive responses without having access to the library. For instance, the analytics server may transmit the tracking pixel (or a portion of the code associated with the tracking pixel) to a third-party where the third-party analyzes the tracking pixel and identifies a suitable web tracking application.

At step 406, the analytics server may provide an indication of the corresponding application. The analytics server may display a prompt onto the merchant device. The prompt, as used herein, may include any electronic notification. For instance, the analytics server may display (or present to be displayed) a graphical user interface on the merchant device, such as a pop-up window or a push notification. In another example, the analytics server may transmit an electronic message (e.g., e-mail, SMS and/or text message) to the merchant device and/or any other electronic devices associated with the merchant. For instance, the analytics server may query a lookup table to retrieve an identifier associated with one or more authorized electronic devices associated with the merchant (e.g., merchant phone number). The analytics server may then transmit a text message and/or a push notification to the identified electronic device.

In another non-limiting example, the analytics server may display the notification on a website associated with the merchant. For instance, the analytics server may display the prompt as a part of a dashboard associated with the merchant platform (e.g., e-commerce platform depicted in FIG. 3). The analytics server may display the prompt in real time (e.g., upon identifying the tracking pixel) or after a predetermined amount of time (e.g., upon the merchant logging into the e-commerce platform and/or upon the merchant viewing the merchant website a predetermined number of times).

The prompt may include text indicating that the analytics server has identified a tracking pixel (or any other code snippet communicating with a third-party server). The analytics server may include an indication of the third-party server receiving web session data via the execution of the code snippet. For instance, the prompt may include a name or a graphical indicator (e.g., logo) associated with the destination server.

The prompt may also include one or more interactive graphical components (e.g., buttons) configured to transmit instructions from the merchant device to the analytics server. For instance, the prompt may include a button requesting the merchant's permission to remove the code snippet associated with the identified tracking pixel. Additionally or alternatively, the prompt may include a button directing the merchant to a platform (e.g., website) of the destination server. Additionally or alternatively, the prompt may also include a button requesting the merchant's permission to install the identified web tracking application.

Figure 5:
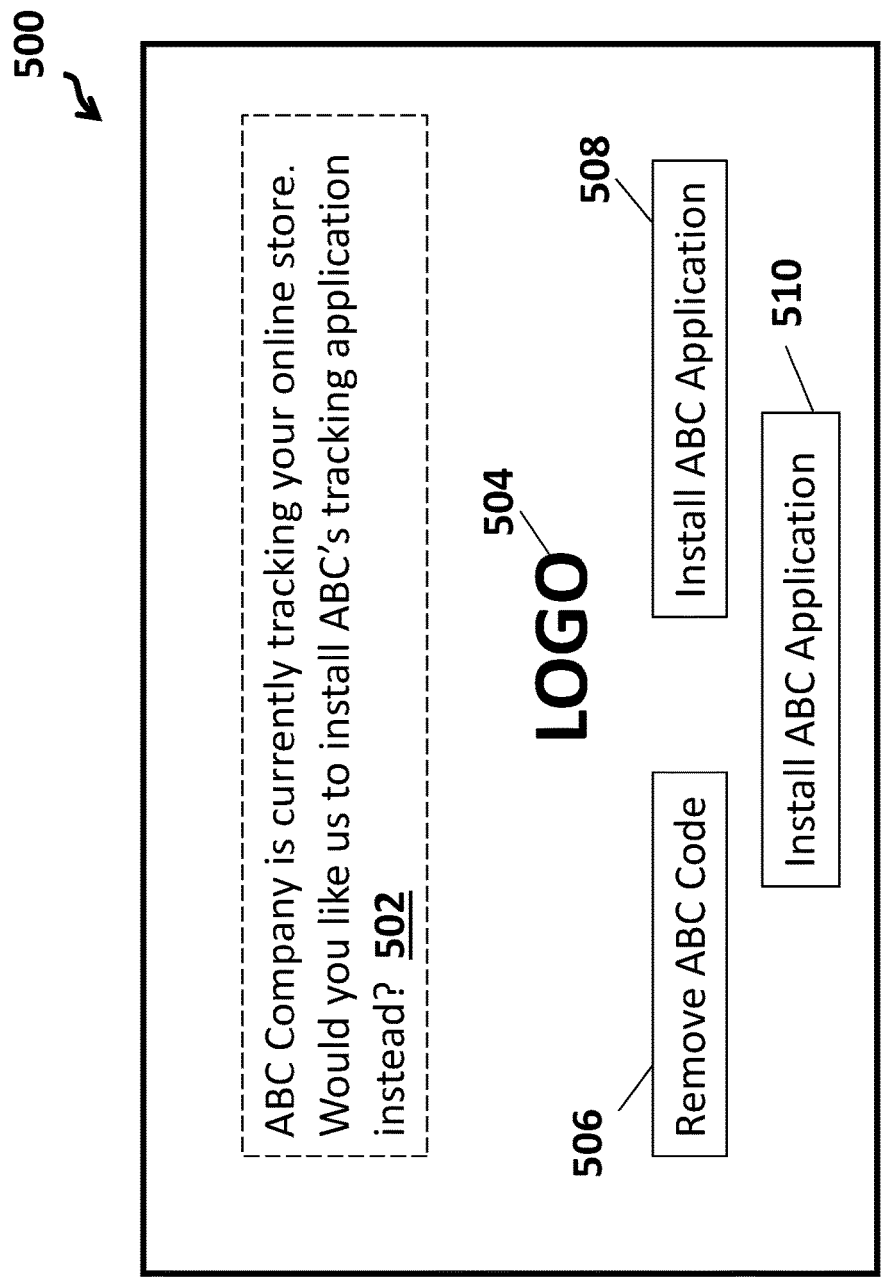
FIG. 5 shows an example of a prompt displayed by a tracking pixel substitution system, according to an embodiment.

Referring now to FIG. 5, a non-limiting example of a prompt displayed (or presented to be displayed) by the analytics server is depicted. The analytics server displays the prompt 500 as a pop-up window on the merchant device. However, in other embodiments, the prompt 500 may be displayed on a secondary device (e.g., pushed to the merchant's authorized mobile device) or be displayed on the merchant's dashboard (e.g., e-commerce platform).

The prompt 500 may include the graphical component 502 indicating that the analytics server has identified a tracking pixel within the merchant's online store (or other website). The graphical component 502 also indicates that the analytics server has identified the tracking pixel to be communicating with a server of ABC Company. The analytics server may retrieve the content of the graphical component 502 from a database. The language used to indicate identification of the tracking pixel may be a pre-generated template that is revisable by the merchant and or a system administrator of the TPSS. The prompt 500 may also include a logo 504 corresponding to ABC Company.

The prompt 500 may include various interactive graphical elements, such as the buttons 506, 508, and/or 510. Even though all three buttons are depicted in FIG. 5, prompt 500 may include fewer or additional buttons. The user may interact with one or more of the buttons to instruct the analytics server. For instance, when the analytics server receives an indication that the merchant has interacted with (e.g., clicked) the button 506, the analytics server may remove the identified code snippet associated with the tracking pixel.

When the analytics server receives an indication that the merchant has interacted with the button 508, the analytics server may trigger an installation of the identified application. The analytics server may retrieve one or more executable files associated with ABC Company's web tracking application. The analytics server may then install ABC Company's web tracking application by executing the corresponding executable files. In some configurations, the analytics server may automatically remove the code snippet when the merchant interacts with the button 608 and/or when the web tracking application is installed.

When the analytics server receives an indication that the merchant has interacted with (e.g., clicked) the button 510, the analytics server may direct the merchant device to a platform (e.g., website or a native application) associated with ABC company. For instance, when the merchant interacts with the button 510, the analytics server may initiate a browser application and direct the browser application to a website or information page (e.g., app store page) associated with the tracking application of the ABC Company. As a result, the merchant may review specification data of the tracking application before installing the web tracking application.

Various visual attributes of the prompt 500 may be customized based on the merchant's preferences. For instance, the merchant may revise size, color, font, and/or other visual attributes of the prompt 500.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc. are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   identifying, by a server, inserted code corresponding to a tracking protocol configured to communicate session data to a second server;
   identifying, by the server, an application associated with the second server, the application having functionality corresponding to the inserted code corresponding to the tracking protocol; and
   causing, by the server, substitution of the application for the inserted code, the causing substitution including:
      triggering, by the server, installation of the application, the application having functionality to replace and remove the inserted code corresponding to the tracking protocol by communicating the session data to the second server; and
      removing, by the server, the inserted code.

2. The computer-implemented method of claim 1, wherein the application is configured to transmit user interaction data to the second server.

3. The computer-implemented method of claim 1, wherein identifying the application comprises determining that the inserted code has a template that matches a template of the application.

4. The computer-implemented method of claim 1, wherein the functionality comprises communicating user interaction data with the second server.

5. The computer-implemented method of claim 1, further comprising:

prior to causing the substitution of the application for the inserted code, providing an indication of the application, wherein providing the indication of the application comprises transmitting, by the server to a client device, a prompt to be displayed on the client device.

6. The computer-implemented method of claim 5, further comprising:
receiving, by the server from the client device, a selection responsive to the prompt, wherein the causing the substitution of the application for the inserted code is performed responsive to the selection.

7. The computer-implemented method of claim 1, further comprising:
in response to determining that the application is installed, automatically removing, by the server, the inserted code.

8. The computer-implemented method of claim 1, further comprising periodically inspecting, by the server, code of a website to identify the inserted code.

9. The computer-implemented method of claim 1, further comprising:
segregating, by the server, the inserted code to monitor the user interaction data transmitted by the inserted code to the second server.

10. A computer system comprising:
a data repository having memory configured to store code; and
a server having a processor in communication with the data repository, the server configured to:
identify inserted code inserted into the code stored onto the data repository, the inserted code corresponding to a tracking protocol configured to communicate session data to a second server;
identify an application associated with the second server, the application having functionality corresponding to the inserted code corresponding to the tracking protocol; and
cause substitution of the application for the inserted code, the causing substitution including:
triggering installation of the application, the application having functionality to replace and remove the inserted code corresponding to the tracking protocol by communicating the session data to the second server; and
removing the inserted code.

11. The computer system of claim 10, wherein the application is configured to transmit user interaction data to the second server.

12. The computer system of claim 10, wherein identifying the application comprises determining that the inserted code has a template that matches a template of the application.

13. The computer system of claim 10, wherein the functionality comprises communicating user interaction data with the second server.

14. The computer system of claim 10, wherein the server is further configured to:
provide an indication of the application prior to causing substitution of the application for the inserted code, wherein providing the indication of the application comprises transmitting, by the server to a client device, a prompt to be displayed on the client device.

15. The computer system of claim 14, wherein the server is further configured to:
receive, from the client device, a selection responsive to the prompt, wherein causing substitution of the application for the inserted code is performed responsive to the selection.

16. The computer system of claim 10, wherein the server is further configured to:
in response to determining that the application is installed, automatically removing, by the server, the inserted code.

17. The computer system of claim 10, wherein the server is further configured to:
periodically inspect code of a website to identify the inserted code.

18. The computer system of claim 10, wherein the server is further configured to:
segregate the inserted code to monitor the user interaction data transmitted by the inserted code to the second server.

19. The computer system of claim 10, wherein the application is configured to monitor user interactions with a platform and transmit user interaction data representing those user interactions to the second server.

20. A non-transitory machine-readable storage medium having computer-executable instructions stored thereon that, when executed by one or more processors, cause the one or more processors to perform operations comprising:
identifying inserted code corresponding to a tracking protocol configured to communicate session data to a second server;
identifying an application associated with the second server, the application having functionality corresponding to the inserted code corresponding to the tracking protocol; and
causing substitution of the application for the inserted code, the causing substitution including:
triggering installation of the application, the application having functionality to replace and remove the inserted code corresponding to the tracking protocol by communicating the session data to the second server; and
removing the inserted code.

* * * * *

UNITED STATES PATENT AND TRADEMARK OFFICE
CERTIFICATE OF CORRECTION

PATENT NO. : 11,711,440 B2
APPLICATION NO. : 17/142958
DATED : July 25, 2023
INVENTOR(S) : Joshua Davey et al.

It is certified that error appears in the above-identified patent and that said Letters Patent is hereby corrected as shown below:

On the Title Page

(54) and in the Specification, Column 1, Lines 1-2, should read CODE MONITORING TO RECOMMEND ALTERNATIVE APPLICATIONS Signed and Sealed this
Fifth Day of September, 2023

Katherine Kelly Vidal
*Director of the United States Patent and Trademark Office*